5799X J. Leonard, Jr., Brainard & Siver,
Pattern for Casting.
Patented Jan. 28, 1830.
A
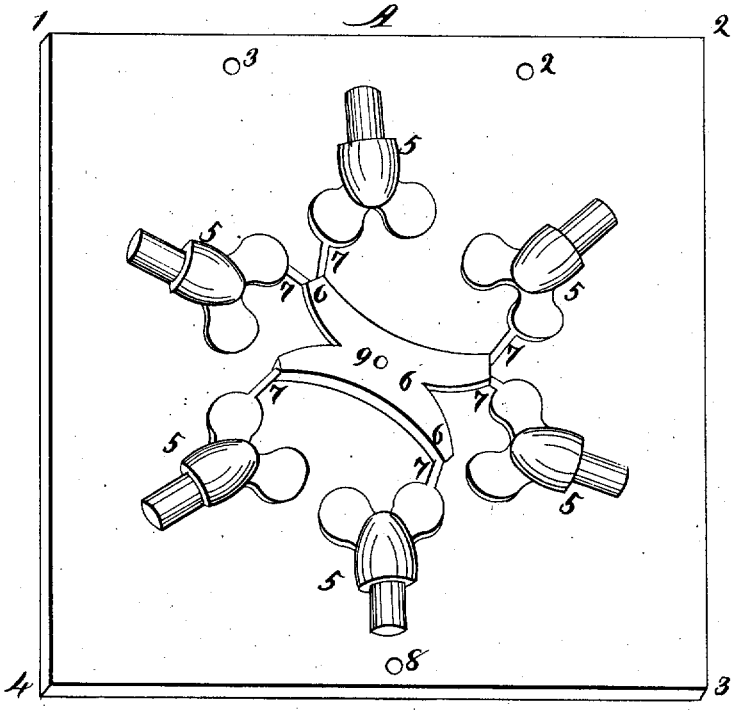
B
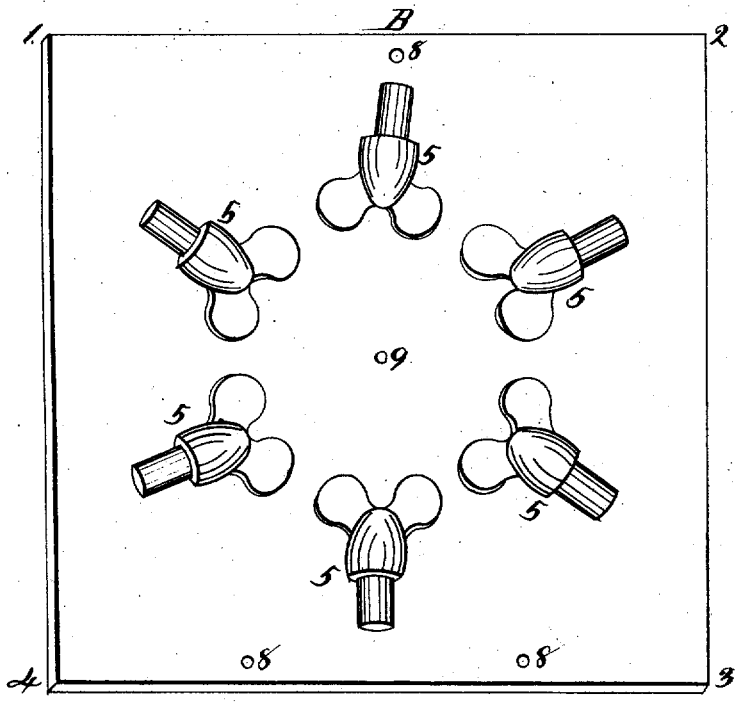
N. PETERS, PHOTO-LITHOGRAPHER, WASHINGTON, D. C.

Jonathan Leonard Junr. Jared S. Brainard & Amasa Sizer

X5799 Letters Patent. Jan. 28, 1830

The schedule referred to in these Letters Patent and making
part of the same containing a description in the words of the
said Jonathan Leonard Jr. Jared S. Brainard & Amasa Sizer
themselves of their improvement in the construction of Patterns
used for forming moulds for casting Iron Brass &c —
Know all men by these presents
That we Jonathan Leonard Jr. of Meriden, Jared S.
Brainard & Amasa Sizer both of Wallingford, have jointly
invented a new and useful improvement in the construction
of Patterns used in forming moulds, for casting Iron, Brass,
or other metals, where a portion of the mould is formed in
two or more parts of the flask commonly used for moulding
which improvement we specify in the words and figures following
(viz) In the first place we make in the usual manner
one or more patterns, according to the number of articles we
intend to cast in a flask, which patterns are made in ex=
act representation of the things we wish eventually to produce
except that they must be large enough to allow for the
shrinking of the metal, which takes place both in casting the
pattern and the things to be formed in most metals, moulded
and cast in the common way. In the next place these
patterns are to be imbedded or let into a board or other proper
substance one half of their thickness flatwise, & a mould is
then to be formed from each pattern, in all respects in the usu
al manner. If the things to be cast are small, as for instance
the common thumb screw, by a judicious arrangement of them
several may be moulded in the same flask, with a view
to produce a Pattern such as is represented in the annexed
drawings marked A & B. In the next place take some strips

X 5799 of wood or other substance about one inch wide, and one one eighth
of an inch in thickness, or as thick as the plate represented in each
of each of the drawings is wanted to be & of such length and
number as that when they are formed together at their ends
they will form a square or such other figure as is needed & as
large as the said plate is intended to be made, the size and
shape of which plate will of course be made to correspond with
the flask to be used in moulding from the plate and pattern attached
to the same, Then place the frame on the sand in the lower part
of a common flask, filled in the usual way and moulded as al
ready directed so that the frame will keep the metal within
itself & place the upper part of the flask upon the lower part
with the frame between them which will keep the two parts
asunder a small distance equal to its thickness. Some small
pieces of some hard substance should also be placed between
the outer parts of each portion of the flask, which pieces should
be of the thickness of the frame & are of use to prevent the
weight which is to be placed in the usual manner upon the
flask from imbedding the frame into the sand. The sprue hole
should be formed in the usual way at a little distance from
the mould to prevent the metal from washing the mould &
in that way produce a defect in the pattern. It will be
necessary that a gate way should be formed for each pattern
& cast at the same time, or afterwards placed upon the plate
and care must be taken, that the metal should be of a proper
temperature when poured in, that the work may be as
perfect as it can conveniently be made. The plate and
patterns attached to the same being now ~~cast should be then~~
cut and finished in the usual way, & if the object is to form
a plate with patterns attached for casting [illegible] [illegible], [illegible]
at a time, the same is illustrated by the annexed drawing
[illegible]. The plate when thus finished must [illegible] [illegible] [illegible]
holes made [illegible] the same of [illegible] [illegible] & in different

XS 7149 sides thereof the object of which is that the plate when used may
be kept steady in its place by as many pins of suitable size pas
sing thro' the holes in the plate and made fast at one end, in
one part of the flask, and entering when the flask is put together
into holes of suitable size and depth made in the other part
of the flask, The two parts of the flask with the plate &
patterns attached between them and the whole kept steady by
the pins being thus prepared are ready to receive the moulding
sand, or to be poured, Each part of the flask, is now to be
filled with moulding sand, and then if that part of the flask
to which the pins are made fast is uppermost lift off this part
of the flask and the plate together, & then take off the plate, but
if the other part of the flask is uppermost, take off this part &
then take off the plate from the other part, so that in both cases
the pins shall guide the plate during its removal. —
By proceeding in the way above specified or with perhaps
some slight variation, a pattern or draft plate with raised
worked patterns or drafts for most kinds of work which are
ordinarily moulded in different parts of a flask, may be for
-med, and moulds made therefrom as is already described
The plate might be formed first and the parts of the patterns
attached thereto by soldering or otherwise, though with much more
difficulty and expense, The plate & the parts of the patterns may
be also formed separately in wood and fastened together, & in
large & heavy work, this would probably be the better mode —
The whole both plate and patterns, might be carved or cut
out of solid wood, but this would also be in general too difficult
~~and expensive~~ The advantages attending moulding in
the ~~above manner~~ are principally experienced in work of a moderate
size, with our patterns less care and skill are requisite in
drawing or removing the patterns without disturbing the moulds;
the greater [illegible] is attained by drawing or removing a con
siderable number of patterns at one operation, also the more

X5799 or sand is prevented from working over or beyond the mid-dle or centre of the pattern & by that means crippling or crum-bling when the pattern is drawn; other less important advanta-ges are not mentioned The Drawing referred to in the foregoing description is annexed and makes a part of this Specification, together with the annexed description of the drawing and the references to the same —

We claim as our specific improvement that we have invented a new and useful mode of constructing pat-terns formed of Metal, wood, or other suitable material, & consisting of a plate with raised work or projecting figures on each side thereof, to be used in making moulds the parts of which are in different parts of a flask and which moulds are fitted for casting work in iron or other metal

But we do not claim the exclusive right of making Patterns, for moulding, or any mode of using them which has heretofore been practised In testimony that the above is a true Specification of our said joint improvement as above described, we have hereunto set our hands and seals, this Nineteenth day of November, A, D, 1829 —

Witness

James Carrington
Medad W. Munson

Jonathan Leonard
Jared S. Brainard
Amasa Sizer

Explanation of Drawings A. & B. 1.2.3.4 represents the plates, on which are the raised Patterns, A. Showing one side, & B. the other side of the plate. 5.5.5. the raised or projecting patterns, 6.6.6. a projection to form a chamber, in the mould connected with the [illegible] and the gateways, 7.7.7. &c the gateways for leading the metal to the moulds, made by Pattern 5. [illegible] the holes [illegible] the p[illegible] in the flask are to pass, 9. The [illegible] for the [illegible] of the pattern & put [illegible] to keep it upright when moulding.